US009558670B1

(12) United States Patent
Sheth et al.

(10) Patent No.: US 9,558,670 B1
(45) Date of Patent: Jan. 31, 2017

(54) METHOD AND SYSTEM FOR AIR TRAFFIC REROUTING FOR AIRSPACE CONSTRAINT RESOLUTION

(71) Applicant: The United States of America as Represented by the Administrator of the National Aeronautics & Space Administration (NASA), Washington, DC (US)

(72) Inventors: Kapil S. Sheth, Campbell, CA (US); B. David McNally, Menlo Park, CA (US); Heinz Erzberger, Los Altos Hills, CA (US); Alexander R. Morando, Rowland Heights, CA (US); Alexis A. Clymer, San Jose, CA (US); Fu-tai Shih, San Jose, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/740,154

(22) Filed: Jun. 15, 2015

Related U.S. Application Data

(63) Continuation-in-part of application No. 13/707,546, filed on Dec. 6, 2012, now Pat. No. 9,171,473.

(60) Provisional application No. 61/567,604, filed on Dec. 6, 2011, provisional application No. 61/664,489, filed on Jun. 26, 2012, provisional application No. 62/012,518, filed on Jun. 16, 2014.

(51) Int. Cl.
*G06F 19/00* (2011.01)
*G06G 7/70* (2006.01)
*G06G 7/76* (2006.01)
*G08G 5/00* (2006.01)

(52) U.S. Cl.
CPC .......... *G08G 5/0039* (2013.01); *G08G 5/0047* (2013.01)

(58) Field of Classification Search
CPC .............................. G08G 5/003; G08G 5/0039
See application file for complete search history.

(56) References Cited

U.S. PATENT DOCUMENTS

| 6,266,610 B1 | 7/2001 | Schultz et al. |
| 6,314,362 B1 | 11/2001 | Erzberger et al. |
| 7,925,393 B2 | 4/2011 | Bolt, Jr. et al. |
| 2003/0023354 A1 | 1/2003 | Brust et al. |

(Continued)

OTHER PUBLICATIONS

Denery, et al., The Center-TRACON Automation system: Simulation and Field Testing, NASA Technical Memorandum 110366, Aug. 1995.

(Continued)

*Primary Examiner* — Imran Mustafa
(74) *Attorney, Agent, or Firm* — Christopher J. Menke; Robert M. Padilla; John F. Schipper

(57) ABSTRACT

A dynamic constraint avoidance route system automatically analyzes routes of aircraft flying, or to be flown, in or near constraint regions and attempts to find more time and fuel efficient reroutes around current and predicted constraints. The dynamic constraint avoidance route system continuously analyzes all flight routes and provides reroute advisories that are dynamically updated in real time. The dynamic constraint avoidance route system includes a graphical user interface that allows users to visualize, evaluate, modify if necessary, and implement proposed reroutes.

17 Claims, 11 Drawing Sheets

(56) References Cited

U.S. PATENT DOCUMENTS

| | | |
|---|---|---|
| 2004/0078136 A1 | 4/2004 | Cornell et al. |
| 2008/0288164 A1* | 11/2008 | Lewis .................. G08G 5/0034 701/120 |
| 2009/0112645 A1 | 4/2009 | Jha et al. |
| 2010/0194628 A1 | 8/2010 | Christianson et al. |

OTHER PUBLICATIONS

Delaura, et al., An Exploratory Study of Modeling Enroute Pilot Convective Storm Flights Deviation Behavior, 12th Conference on Aviation Range and Aerospace Meteorology, Oct. 17, 2006.

Robinson, et al., The Route Availability Planning Tool (RAPT): Evaluation of Departure Management Decision Support in New York During the 2008 Convective Weather Season, Eighth USA/Europe Air Traffic Management Research and Development Seminar, 2009.

Rubnich, et al., An Algorithm to Identify Robust Convective Weather Avoidance Polygons in En Route Airspace, 10th AIAA Aviation Technology, Integration, and Operations (ATIO) Conference, Sep. 13-15, 2010, Fort Worth, Texas.

Erzberger, et al, "Automated Conflict Resolution, Arrival Management and Weather Avoidance for ATM," 27th International Congress of the Aeronautical Sciences (ICAS), Sep. 2010.

McNally, et al., A Near-Term Concept for Trajectory-Based Operations with Air/Ground Data Link Communication, Airspace User's Forum, NASA Ames Research Center, Oct. 6-7, 2010.

\* cited by examiner

Dynamic Weather Routes

| TP | ACID/TYP | DEP/DST | DRCT | DWR | FIX/VIA | TR | SC | WX |
|---|---|---|---|---|---|---|---|---|
| ☐ | UAL561/A319 | MSY/DEN | 16.3 | 15.0 | HBU/1 | 8 | OK | OK |
| ☐ | FFT383/A319 | KFLL/KDEN | 14.2 | 12.2 | HBU/1 | 6 | OK | OK |
| ☐ | FFT675/A319 | KMCO/KDEN | 13.9 | 10.8 | HBU/1 | 13 | OK | OK |
| ☐ | AAL2411/B752 | KDFW/KLAX | 13.2 | 12.1 | ALIBY/1 | OK | OK | OK |
| ☐ | AAL1143/MD82 | DFW/OMA | 11.3 | 10.7 | SGF/1 | OK | OK | OK |
| ☐ | TCF7671/E170 | KATL/KDEN | 9.4 | 9.4 | HBU | OK | OK | OK |
| ☐ | SWA418/B737 | KJAX/KLAS | 9.3 | 6.5 | GUP/2 | OK | OK | OK |
| ☐ | CPZ5663/E170 | DGW/MSP | 9.2 | 9.2 | SGF | OK | OK | OK |
| ☐ | TCF7518/E170 | KSAT/KORD | 9.0 | 9.0 | BAYLI | OK | OK | OK |
| ☐ | SKW4727/CRJ9 | DFW/SLC | 6.9 | 6.9 | JNC | OK | OK | OK |
| ☐ | AAL1821/B738 | KMIA/KLAS | 6.6 | 5.4 | GUP/1 | OK | OK | OK |
| ☐ | AAL1157/MD83 | DFW/SEA | 6.2 | 5.6 | JNC/2 | OK | OK | OK |

METHOD AND SYSTEM FOR AIR TRAFFIC REROUTING FOR AIRSPACE CONSTRAINT RESOLUTION

CROSS-REFERENCE TO RELATED APPLICATIONS

This application is a Continuation-In-Part of U.S. patent application Ser. No. 13/707,546, filed Dec. 6, 2012, which claims the benefit of U.S. Provisional Application Nos. and 61/567,604 and 61/664,489, filed Dec. 6, 2011 and Jun. 26, 2012, respectively, and this application also claims the benefit of U.S. Provisional Application No. 62/012,518, filed Jun. 16, 2014, which are all hereby incorporated by reference herein in their entireties.

ORIGIN OF INVENTION

The invention described herein was made in the performance of work under NASA contracts and by employees of the United States Government and is subject to the provisions of §20135(b) of the National Aeronautics and Space Act, Public Law 111-314, §3 (124 Stat. 3330, 51 U.S.C. Chapter 201), and 35 U.S.C. §202 Public Law 96-517, and may be manufactured and used by or for the Government for governmental purposes without payment of any royalties thereon or therefore.

BACKGROUND OF INVENTION

1. Technical Field of the Invention

This invention relates generally to the field of trajectory rerouting of aircraft, from pre-departure through arrival, for constraint avoidance, and more particularly, to computer automated trajectory re-routing of aircraft around constraints for more efficient time-saving and fuel saving constraint avoidance route corrections.

2. Description of Related Art

Weather is the leading cause of delay in the U.S. National Airspace System, and convective weather accounts for 60% of weather-related delays. Convective weather is common in the spring and summer months and can extend for hundreds of miles and reach altitudes well in excess of 40,000 feet. When weather is present or forecast along preferred flight routes, weather avoidance routes are planned and implemented, usually prior to take off. While aircraft are in flight, airline dispatchers and U.S. Federal Aviation Administration (FAA) traffic managers and controllers review weather updates and traffic flows to determine if and how flights may be rerouted to improve flow and reduce delay. However, real-time automation that continuously searches for and proposes time- and fuel-efficient corrections to existing weather avoidance routes for in-flight aircraft does not exist. And operators are busy especially during weather events and may miss workable opportunities for more efficient flight routes around weather. It would therefore be an improvement over the prior art to provide a system that automatically analyzes in-flight aircraft in en-route airspace, and finds simple reroutes that result in more efficient flight around convective weather and potentially save substantial flying time and fuel.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

SUMMARY OF THE INVENTION

The present invention provides an automated system for trajectory rerouting of aircraft for constraint avoidance. Constraints include special use airspace (SUA), weather, temporary flight restriction (TFR) airspace, and other limitations on the use of specified airspace. The system uses computer automation to continuously and automatically compute and propose time-saving and fuel saving corrections to current routes for aircraft. Given the relatively large potential for flying time-saving for example, on the order of 5 to 25 minutes per eligible flight, the automation may be used by airline flight dispatchers and may be configured for use by U.S. Federal Aviation Administration (FAA) traffic managers and air traffic controllers.

In accordance with one illustrative aspect of the present invention, there is provided a computer implemented method for a continuous and automatic real-time search that generates time-saving flight route corrections for aircraft, avoiding constraints. The method includes searching for and identifying aircraft and their associated flight plans in multiple Centers; identifying an aircraft having a dog-leg in its associated flight plan; generating limit polygons corresponding to each of the multiple Centers, where each of the limit polygons is defined by waypoints that have been historically used by the corresponding Center to direct flights; generating at least one reference flight route having a starting point at or near the aircrafts' current position within a limit polygon, and an ending point within or on the same limit polygon, and wherein the reference route saves a predetermined number of minutes of wind-corrected flying time on the associated flight plan; searching for constraints along the reference route; processing constraint data using a computer processor to identify and avoid constraints along the reference route; generating a proposed flight route avoiding all constraints; testing the proposed flight route for parameter minimum flying time savings relative to the associated flight plan; selecting the proposed flight route as a dynamic constraint avoidance route; and updating the associated flight plan with the dynamic constraint avoidance route.

In accordance with another illustrative aspect of the invention, there is provided a computer implemented method for a continuous and automatic real-time search that generates and proposes time-saving flight route corrections for a plurality of aircraft, that could avoid constraints while saving flight time. The method includes searching for and identifying aircraft and their associated flight plans in multiple Centers; receiving real-time updates of aircraft state data and airspace constraint data relevant to the plurality of aircraft, wherein the airspace constraint data includes real-time constraint data; generating limit polygons corresponding to each of the Centers, where each of the limit polygons are defined by waypoints that have been historically used by the corresponding Center to direct flights; processing trajectory predictions for the plurality of aircraft based on the real-time updates of aircraft state data and airspace constraint data; generating a plurality of reference flight routes having a starting point at or near the aircrafts' current position within a limit polygon, and an ending point within or on the same limit polygon, and wherein the reference route saves a number of minutes of wind-corrected flying time on the associated flight plan; identifying reference flight routes saving a predetermined number of minutes of wind-corrected flying time on the associated flight plan; searching for constraints along the reference routes; processing constraint data using a computer processor to identify and avoid constraints along the reference routes; generating a proposed flight route avoiding all constraints; testing the proposed flight route for parameter minimum flying time savings relative to the associated flight plan; proposing a flight route as a dynamic constraint avoidance route; and repeating the above, continuously and automatically, for the plurality of aircraft as real-time updates of aircraft state data and airspace constraint data relevant to the plurality of aircraft are received.

In related aspects of the present invention, generating of at least one reference flight route includes generating a plurality of reference flight routes; flight route corrections are generated for a plurality of aircraft; a computer graphic user interface displays the proposed flight route when one or more of the aircraft's associated flight route has been processed and a proposed flight plan has been generated; the predetermined number of minutes of wind-corrected flying time on the associated flight plan is greater than 5 minutes; and generating a proposed flight route avoiding all constraints includes generating one or more auxiliary waypoints to identify one or more proposed flight routes.

In more related aspects of the invention, the method may include selecting aircraft for dynamic constraint routing based on a predetermined flying time savings of the reference routes relative to the associated flight plans; displaying the flight route information and flying time savings on the computer graphic user interface for the aircraft based on the dynamic constraint avoidance routes; notifying users of congested sectors, Special Activity Area encounters, and FAA imposed reroute traffic management initiatives along the current associated flight plans and dynamic constraint avoidance routes; selecting the proposed flight route as a dynamic constraint avoidance route; and updating the associated flight plan with the dynamic constraint avoidance route.

In further related aspects of the invention, generating a proposed flight route avoiding all constraints further includes creating constraint polygons using user-entered data and generating proposed flight routes avoiding one or more of the constraint polygons; two or more constraint polygons are merged if they overlap at a similar altitude and a similar time; proposed flight routes include a user-specified distance buffer around the constraint polygons; and the multiple Centers include 20 separate Centers.

These and other advantages are achieved in accordance with various illustrative embodiments of the present invention as described in detail below.

BRIEF DESCRIPTION OF THE DRAWINGS

The features and advantages of the disclosure will become apparent from a consideration of the subsequent detailed description presented in connection with the accompanying drawings in which:

FIG. 7 is an exemplary screen shot of a dynamic weather route flight list generated pursuant to an illustrative embodiment of the present disclosure;

DETAILED DESCRIPTION

Figure 1:
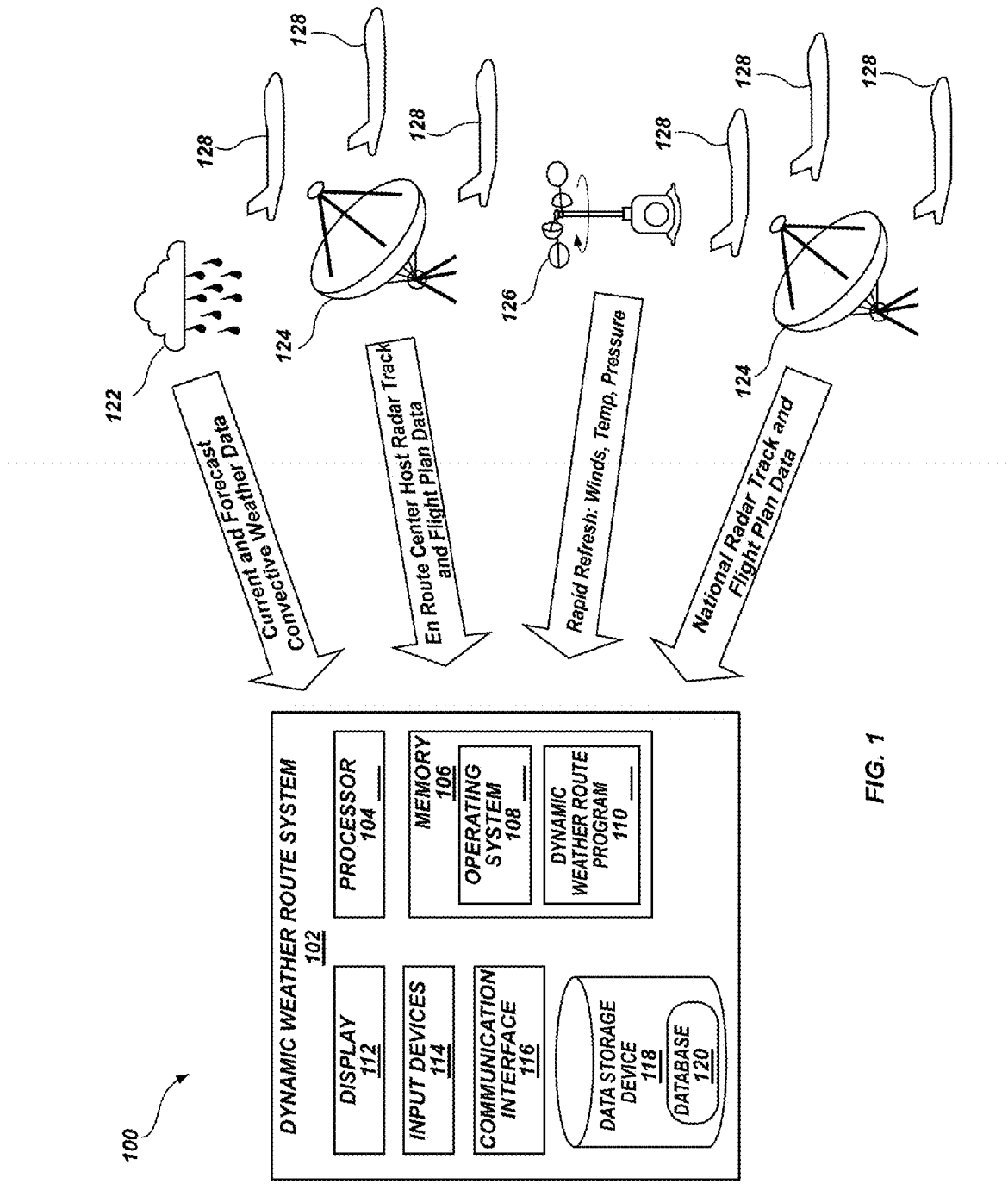
FIG. 1 is a block diagram of an exemplary dynamic weather route system according to an illustrative embodiment of the present disclosure.

For the purposes of promoting an understanding of the principles in accordance with the disclosure, reference will now be made to the illustrative embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Referring now to FIG. 1, there is shown a block diagram of a framework 100 for dynamically routing in-flight aircraft pursuant to an illustrative embodiment of the present invention. The framework 100 comprises a dynamic weather route system 102 for generating dynamic weather routes for in-flight aircraft.

In an illustrative embodiment, the dynamic weather route system 102 comprises a processor 104 coupled to a memory 106. It will be appreciated that the processor 104 executes computer-readable instructions, known as programs or applications, to perform the functions and features described herein. It will be further appreciated that while only a single processor 104 is depicted in FIG. 1, that the processor 104 may comprise a plurality of processors spread out over several machines.

In an illustrative embodiment, the dynamic weather route system 102 comprises a collection of computer servers, each having its own processor, that are connected to an internal, or external, network in what is commonly referred to as a "server farm," with each server performing unique tasks or the group of servers sharing the load of multiple tasks. Each server of a server farm includes a processor coupled to a memory. The server farm is scalable as is known to those skilled in the art to accommodate large demand on the dynamic weather route system 102. For example, the dynamic weather route system 102 may comprise a server farm having a plurality of servers. In an illustrative embodiment, a plurality of users may access the dynamic weather route system 102 from remote computing devices to access the features and functionalities of the system 102.

Loaded into the memory 106 is a program commonly known as an operating system 108. It will be appreciated that the operating system 108 may be selected from a wide range of commercially available operating systems, including, without limitation, the different versions of Microsoft® Windows®, Linux, and Mac OS®. In an embodiment, the system 102 uses the Linux operating system running on one single rack-mounted processor (ASL Lencelot 1876-T, 3.07 Gz).

Also, stored in the memory 106 is a dynamic weather route program 110. The dynamic weather route program 110, contains instructions, that when executed by the processor 104, cause the processor 104 to generate dynamic weather routes for in-flight aircraft as will be described more fully herein. In an illustrative embodiment, the dynamic weather route program 110 includes several different subsets of executable code that are selectively loaded into the memory 106. In an illustrative embodiment, the executable code of the dynamic weather route program 110 may be located in several independent executable files. In an illustrative embodiment, the dynamic weather route program 110 includes one or more modules. As used herein, the term "module" refers to a section of the code of the dynamic weather route program 110, that may or may not be located in separate executable files.

The dynamic weather route system 102 further comprises a computer display 112 and input devices 114. In regard to the input devices 114, they may comprise a keyboard and computer mouse.

The dynamic weather route system 102 further comprises a communication interface 116 that allows the system 102 to communicate with other computing devices over a network to receive and transmit data, including local area networks and wide area networks. The dynamic weather route system 102 further comprises a data storage device 118, such as a hard drive or an array of hard drives that contains a database 120 and operational data.

As will be described below, the dynamic weather route system 102 receives data inputs from a wide variety of sources to compute dynamic weather routes for in-flight aircraft. The data inputs are nominally one of live data feeds recorded data feeds.

The dynamic weather route system 102 receives current and forecast weather model data from a weather data source 122. In an illustrative embodiment, the weather data comprise current and forecast model data from the Corridor Integrated Weather System (CIWS), which was developed at MIT Lincoln Laboratory. CIWS is based on analysis of vertically integrated data and echo top data from NexRad weather radars. (NexRad is a network of high-resolution S-band Doppler weather radars operated by the National Weather Service, an agency of the National Oceanic and Atmospheric Administration of the United States Department of Commerce.) In an illustrative embodiment, the weather data are updated every 5 minutes and each update includes forecast weather out to two hours in 5 minute forecast time step intervals.

The dynamic weather route system 102 receives host radar tracking data and flight plan data from a radar data source 124. In an illustrative embodiment, the radar data source 124 is the Center Host or En Route Automation Modernization computer system operated by the FAA. In an embodiment, the radar track data and flight plan data are updated every 12 seconds with fresh surveillance tracking data and flight plan amendments. It will be appreciated that frequent updates are needed so that flight plan intent is up to date and traffic conflict detections are reliable.

The dynamic weather route system 102 receives atmospheric data, including wind, temperature, and pressure data, from an atmospheric monitoring and forecast modeling source 126. In an illustrative embodiment, the atmospheric monitoring and modeling source 126 is the National Oceanic and Atmospheric Association (NOAA) Rapid Refresh atmospheric data, including wind forecasts. In an illustrative embodiment, the atmospheric data are updated every hour from the atmospheric monitoring source 126.

The dynamic weather route system 102 receives national surveillance radar track and flight plan data from an air traffic data source 128. In an illustrative embodiment, the air traffic data source 128 comprises the Enhanced Traffic Management System (ETMS) or the undelayed Aircraft Situation Display to Industry (ASDI) system. In an illustrative embodiment, the air traffic data are updated every minute from the air traffic source 128.

Prior to proceeding, it is important to note that the present invention leverages several existing technologies to implement its features and functionalities described herein. In an illustrative embodiment, these existing technologies are integrated directly into the dynamic route system 102 such that processor 104 performs them. For example, code from these existing technologies may be included in the dynamic weather route program 110. In an illustrative embodiment, these existing technologies may be run on a separate computer server that provides its resources to the dynamic weather route system 102 over a network. In an illustrative embodiment, these existing technologies are operated by third parties.

In an illustrative embodiment, the existing technologies include the Corridor Integrated Weather System (CIWS), the Convective Weather Avoidance Model (CWAM), both of which were developed by the MIT/Lincoln Laboratory. In an illustrative embodiment, the existing technologies further includes the Center/TRACON Automation System (CTAS), the Future Air Traffic Management Concepts Evaluation Tool (FACET) and the automatic weather and traffic conflict resolution elements in the Advanced Airspace Concept (AAC) automation software suite, all of which were developed by the National Aeronautics and Space Administration (NASA). (Erzberger, H. and Lauderdale, Todd and Chu, Yung-Cheng, "Automated Conflict Resolution, Arrival Management and Weather Avoidance for ATM" (2010), 27th International Congress of the Aeronautical Sciences (ICAS), Nice, France, 19-24 Sep. 2010, is hereby incorporated by reference in its entirety by way of background disclosure.) It will be appreciated that the present invention augments the capabilities of these existing technologies as described herein.

Figure 2:
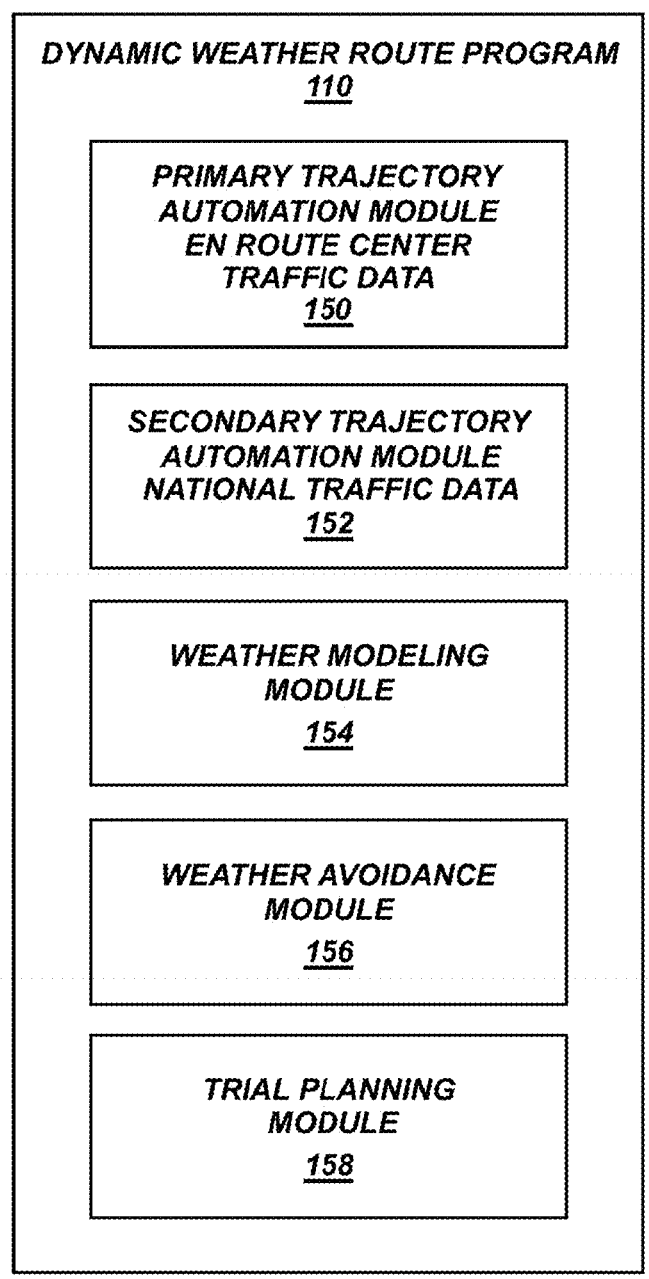
FIG. 2 is a block diagram of an exemplary dynamic weather route program according to an illustrative embodiment of the present disclosure.

Referring now to FIG. 2, the dynamic weather route program 110 includes a primary trajectory automation module 150, a secondary trajectory automation module 152, a weather modeling module 154, a weather and traffic avoidance module 156, and a trial planning module 158. The operation of each of these is described generally below.

The primary trajectory automation module 150 computes 4D trajectories for all in-flight aircraft in a designated airspace. In an illustrative embodiment, the primary trajectory automation module 150 computes 4D trajectory predictions (x, y, h, time) for all flights using live or recorded data feeds. The primary inputs into the primary trajectory automation module 150 are Center Host or ERAM surveillance radar track messages, Center Host or ERAM route and altitude flight plan intent messages as entered and updated by controllers, NOAA Rapid Refresh atmospheric data, including wind forecasts, updated every 1 hour, and a database of aircraft performance models. All flight trajectories are updated upon receipt of fresh radar track and flight plan messages entered into the FAA's en route Center Host or En Route Automation Modernization (ERAM) computer system. It will be appreciated that the Host track and flight plan updates are needed so that flight plan intent is up to date and traffic conflict detections are reliable. In an illustrative embodiment, trajectories include modeled top-of-climb and top-of-descent points and incorporate hourly Rapid Refresh wind updates that include wind variation with altitude. Updating may occur periodically, such as every 12 seconds. In an illustrative embodiment, the primary trajectory automation module 150 incorporates the existing technology of CTAS.

In an illustrative embodiment, the primary trajectory automation module 150 compares all fresh flight trajectories to modeled weather polygons computed by the weather modeling module to determine or detect when flight trajectories conflict with modeled weather polygons.

In an illustrative embodiment, the primary trajectory automation module 150 converts to candidate alternate routes generated by the weather avoidance module 156 and the trial planning module 158 into trial flight trajectories. The primary trajectory automation module 150 then tests these candidate alternate routes for conflict with modeled weather polygons and returns conflict status information to the weather avoidance module 156 and/or trial planning module 158.

The secondary trajectory automation module 152 computes 4D trajectories and predicted sector loadings for all flights in a designated airspace. Trajectories and sector load predictions are updated every 1 minute using data from the ETMS and ASDI. In an illustrative embodiment, the secondary trajectory automation module 152 estimates the potential impact of a reroute on downstream sector congestion; many of the relevant sectors are outside of the Center where the flight is currently flying. Inclusion of downstream sector analysis capability is important because some of the proposed reroutes substantially change the route of flight. One particular factor that is analyzed is whether or not the reroute takes an aircraft through a nearby downstream sector that is already over capacity, or the potentially more desirable case where the reroute takes an aircraft out of sectors that are over capacity and potentially into sectors that are under capacity. In an illustrative embodiment, the secondary trajectory automation module 152 incorporates the existing technology of FACET.

The weather modeling module 154 predicts regions of convective weather in terms of polygons, which are characterized in terms of storm intensity and storm tops. The weather modeling module 154 predicts storm intensity, movement and growth over time up to a two-hour look-ahead time. Model input data are updated periodically, e.g., every 5 minutes. A suitable look-ahead time step, e.g., every 5 minutes, is selected to update predicted future storm polygons. In an illustrative embodiment, the weather modeling module 154 incorporates the existing technology of CWAM.

The weather avoidance module 156 attempts to find alternate routes when modeled weather cells are detected along a flight plan route, or along a reference flight plan route, or along a Direct-To route. In an illustrative embodiment, the weather avoidance module 156 incorporates the technology of ACC.

In accordance with another illustrative aspect of the present invention, there is provided a method for automatically computing candidate alternate routes relative to the reference flight plan route such that the trajectories for the alternate routes do not conflict with modeled weather, or optionally modeled weather and traffic. The alternate routes selected for further analysis are ones that avoid weather, and optionally traffic, and have trajectories with minimum flying time delay relative to reference flight plan trajectories. The method includes an iterative process whereby multiple alternate route options all that avoid one or more modeled weather polygons between present position and a downstream flight plan fix are computed and tested. Alternate routes are computed by inserting one or more auxiliary flight plan waypoints near the boundaries of modeled weather polygons. Alternate route options may for example initially turn the aircraft to the left or to the right of the reference flight plan to avoid the first weather polygon and then find a route to the downstream flight plan fix that does not conflict with any secondary weather polygons downstream of the first one. Trajectories for all alternate route options are computed and probed against modeled weather polygons which are generally moving, growing, or decaying with time according to the forecast weather model. Successful solutions are then optionally further modified to resolve traffic conflicts. The successful solution with the minimum flying time delay relative to the reference flight plan is then returned as a candidate dynamic weather route, which is further tested to determine potential flying time savings relative to the current flight plan route.

In accordance with still another illustrative aspect of the present invention, alternate routes that avoid weather polygons are computed geometrically with limits on complexity built into the route generation process. This is an improvement to common methods that have been developed to create paths through fields of polygons, e.g., the Dijkstra method. The core geometric solution relies on two core elements, the first determines tangent lines from a point to the boundary of a polygon while the second determines tangent lines between non-intersecting polygons, e.g., between the first detected polygon and any secondary polygons.

Figure 6:
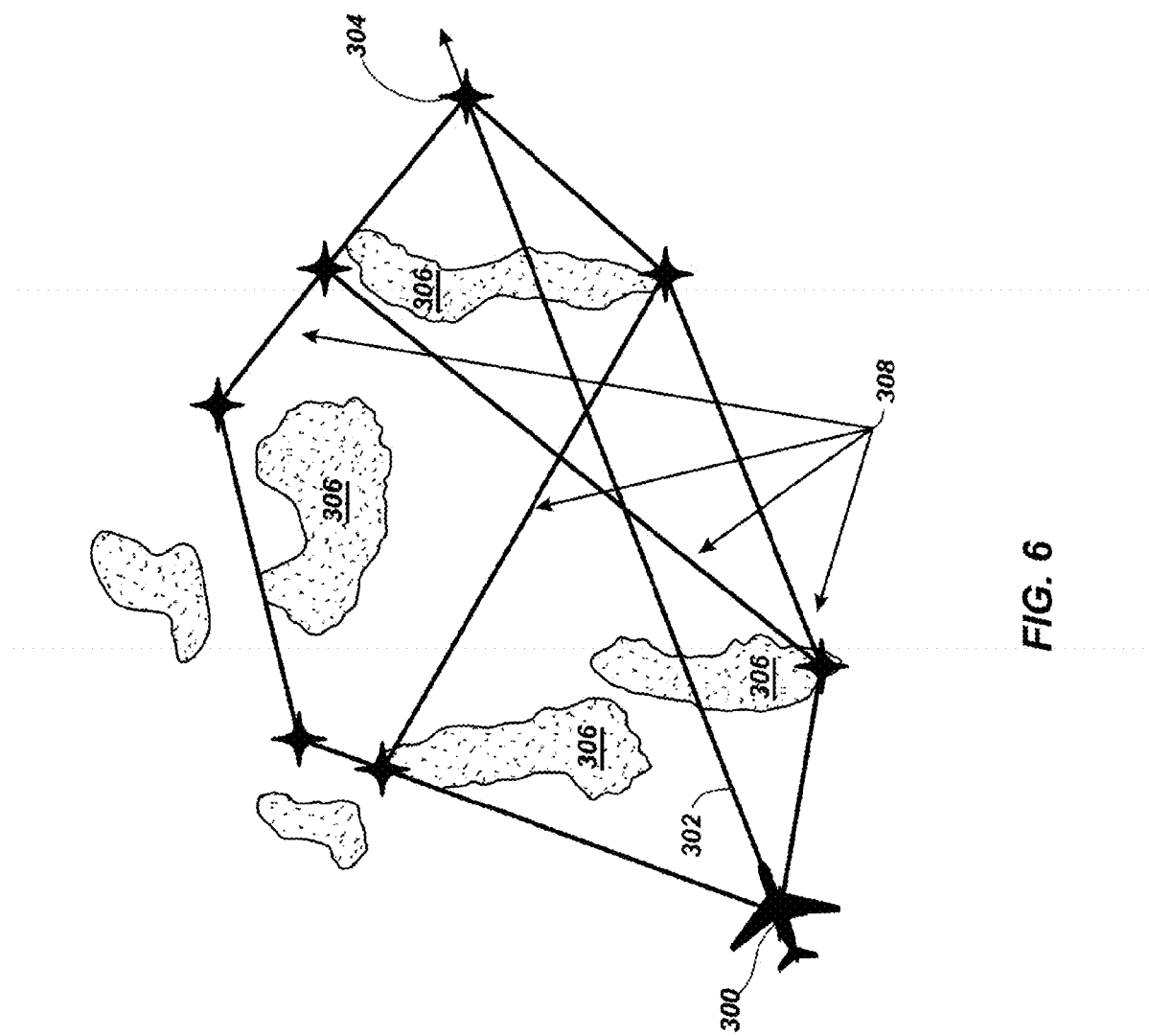
FIG. 6 depicts a diagram showing four possible exemplary alternate routes around multiple weather cells according to an illustrative embodiment of the present disclosure.

For example, as shown in FIG. 6, there is depicted a flight 300 having a direct-to reference flight plan route 302 to a waypoint 304. As can be observed, the route 302, if taken, would cross two weather polygons 306. Four possible flight paths 308 to waypoint 304 are generated by the present invention around the two weather polygons 306 that include interior tangent routes.

In accordance with another illustrative aspect of the present invention, calculating new route deviations may include using at least one auxiliary waypoint and/or at least one named fix.

In accordance with another illustrative aspect of the present invention, alternated routes are limited so that heading changes between present position and subsequent auxiliary waypoints, and between multiple auxiliary waypoints, and between the last auxiliary waypoint and the return capture fix may be limited so as not to propose very large heading changes which are generally not appropriate for commercial airline flight trajectories. The relative position of auxiliary waypoints may be limited so as not be to so close to one another that they are generally not appropriate for commercial airline flight trajectories.

In accordance with another illustrative aspect of the present invention, auxiliary waypoints may be adjusted to include suitable buffers between modeled weather and the resulting flight trajectories.

In accordance with another illustrative aspect of the present invention, alternate routes may be limited so that flight trajectories do not pass through narrow gaps between weather polygons.

The trial planning module 158 is an automated and interactive "what-if" trial planning function that allows users to quickly and easily visualize a proposed reroute using a graphical user interface, easily modify the route if necessary using point, click, and drag actions, and evaluate in real-time the impact of any modifications to the proposed route on critical parameters including proximity to weather, wind-corrected flying time savings or delay, sector congestion on the current flight plan route and the proposed trial flight plan route, traffic conflicts, and conflict with active special use airspace. The trial planner also facilitates automated switching between auxiliary waypoints which are defined generally in terms of fix-radial-distance or latitude/longitude coordinates to nearby named auxiliary waypoints which are easier to implement in today's operations. The trial planning function also facilitates timely implementation of the reroute either by voice or by integration with other flight planning systems including air/ground data link communication. The trial planning module incorporates existing technology in CTAS and Direct-To and their associated displays.

Figure 3:
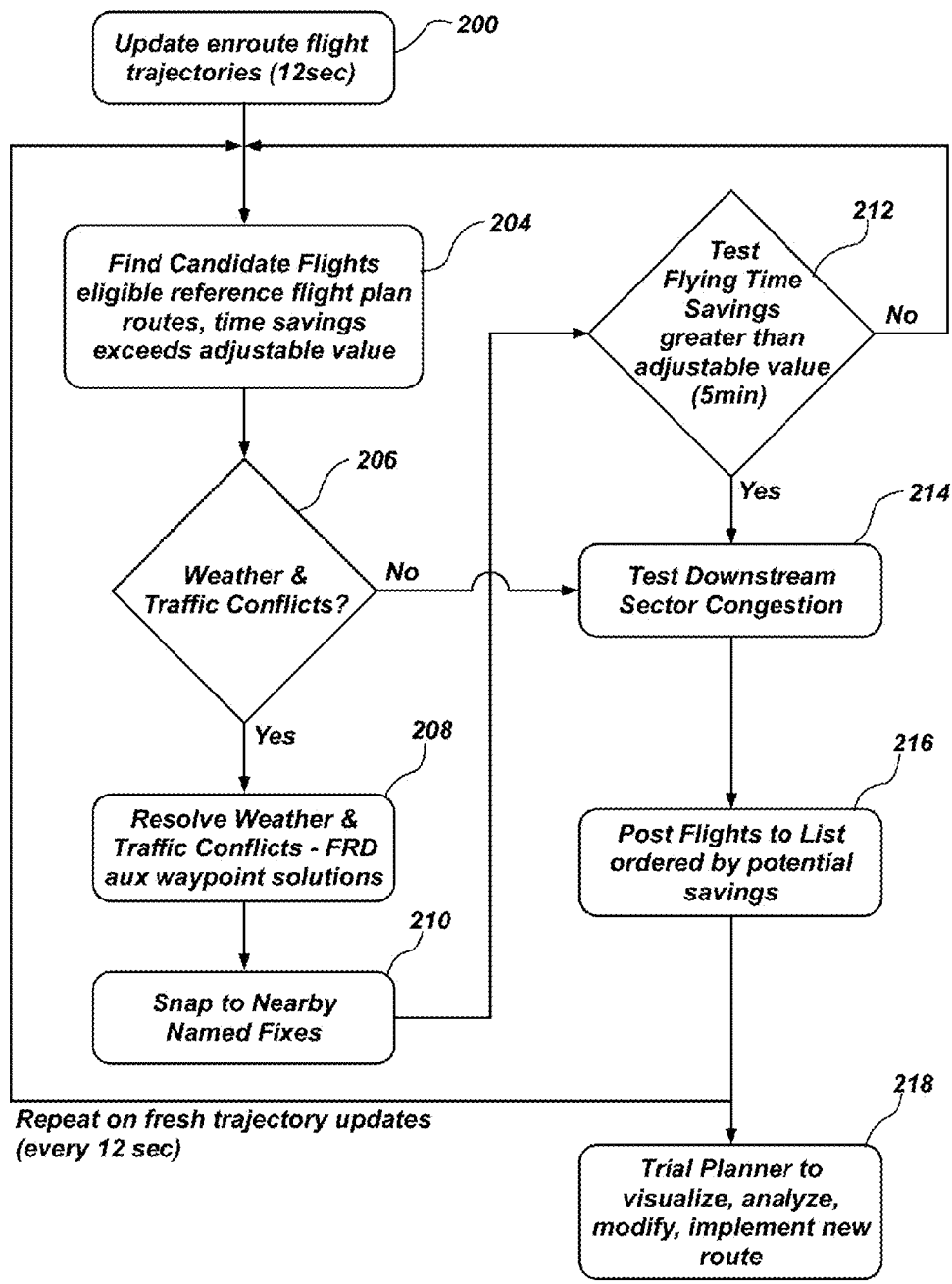
FIG. 3 is an exemplary flow diagram of a method for generating dynamic weather routes according to an illustrative embodiment of the present disclosure.

Referring now to FIG. 3, the operation of the dynamic weather route system 102 to find dynamic flight plan routes for in-flight aircraft will now be described in more detail. At step 200, the dynamic weather route system 102 updates the flight plan trajectories for all in-flight aircraft in en route Center airspace. At step 204, the dynamic weather route system 102 automatically analyzes the most recent trajectory updates to find flights that could potentially benefit from a more efficient routing around weather or other conflicts.

The objective of analyzing the most recent trajectory updates is two-fold. First, the dynamic weather route system 102 finds flights with large course changes or "dog-legs" in their current flight plan routes. Second, for each of the flights, the dynamic weather route system 102 identifies a reference flight plan route that eliminates the dog-leg and returns the aircraft to its current route of flight at some downstream return capture fix and by doing so could save an adjustable minimum amount of wind-corrected flying time, e.g., 5 minutes.

Figure 4:
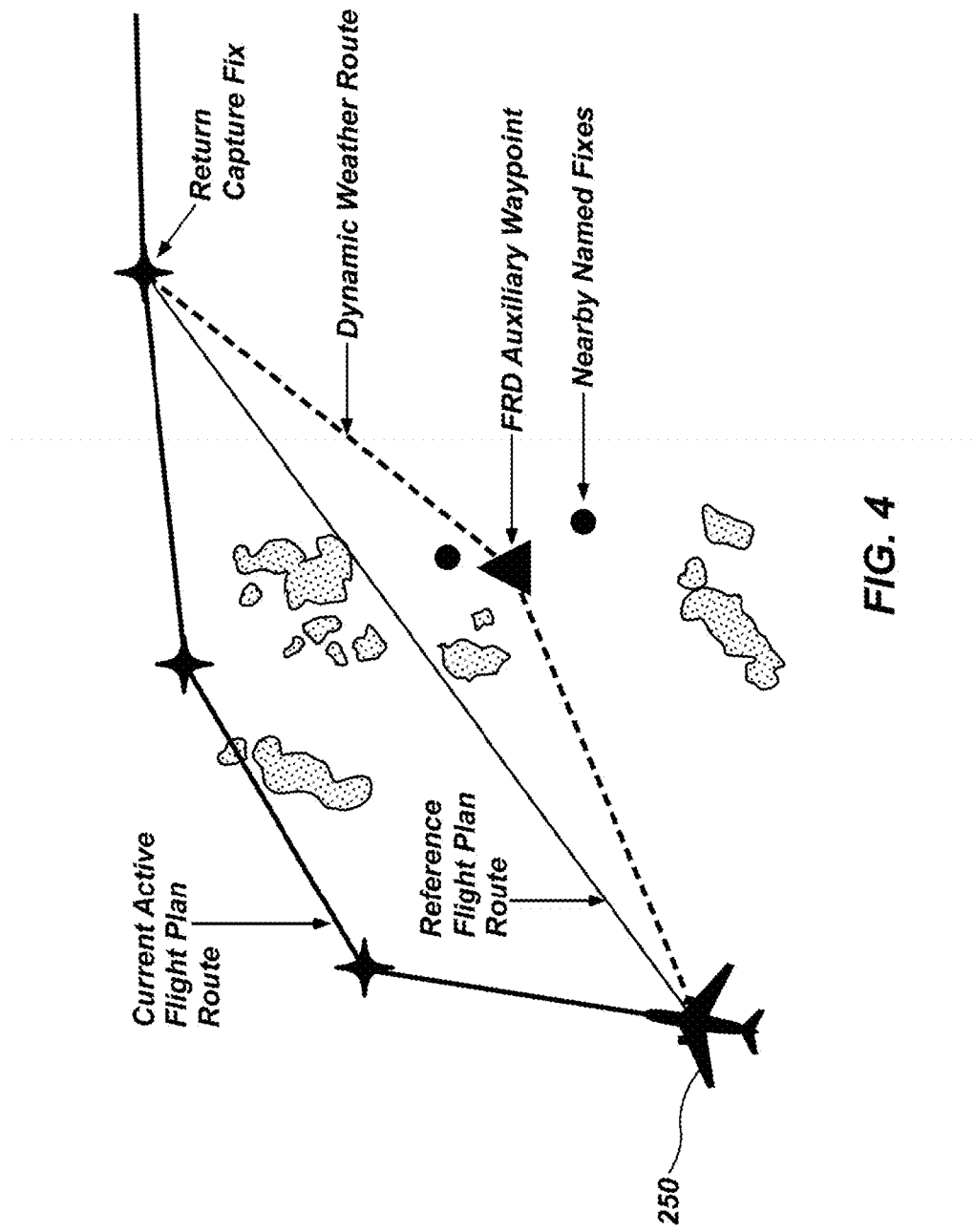
FIG. 4 is a diagram of a current active flight plan route of a flight, a reference flight plan route, and a dynamic weather route generated according to an illustrative embodiment of the present disclosure.

For example, FIG. 4 depicts a current active flight plan route of an aircraft 250. Also shown is the reference flight plan route for the aircraft 250 generated by the dynamic weather route system 102. It will be noted that the reference flight plan route eliminates the dog-leg in the current active flight route plan. In addition, the reference flight route plan returns the aircraft 250 to its current active flight plan route at a downstream capture fix. In order for the flight to be considered for further analysis, this reference flight plan route must be able to save an adjustable minimum amount of wind-corrected flying time, e.g., 5 minutes.

At this point, it will be appreciated that the reference flight plan route is not necessarily free of weather and traffic conflict. It is, however, a theoretically more desirable route and later steps will determine necessary adjustments to enable a conflict-free route that is as close as possible to the reference flight plan route.

Further, it will be appreciated that the presence of a large course change or dog-leg in a downstream route of flight is a strong indication that the flight is on a route previously implemented for weather avoidance. A large course change or dog-leg in a current flight plan is generally defined to exist when a reference flight plan can be found which saves more than an adjustable amount of wind-corrected flying time, e.g., 5 minutes. In an illustrative embodiment, the return capture fix is an existing fix on the current active flight plan route. The reference flight plan route generated by the dynamic weather route system 102, and not the current active flight plan route, is the basis for resolving weather and traffic conflicts as will be described in more detail hereinafter.

The notion of a reference flight plan route is based on the important assumption that in cases where large dog-legs are present in the current route of flight, the flight might be eligible for a time and fuel saving reroute. If anticipated weather conflicts do not materialize, or if the weather has changed since the current active flight plan was implemented, then the aircraft should be able to fly something closer to the reference flight plan route instead of the current flight plan.

In an illustrative embodiment, the reference flight plan route generated by the dynamic weather route system 102 is one of a direct route to a suitable downstream fix, a wind-optimal route to a downstream fix, or a route to a more efficient standard arrival route (STAR) into the destination airport, or some other user-preferred route. In an illustrative embodiment, the distinguishing characteristic of the reference flight plan route is that it proposes a flight plan route that is substantially more favorable than the current flight plan route and would likely be acceptable if there were no weather.

In an embodiment, the reference flight plan route will most always reflect a relatively large wind-corrected flying time savings relative to the current flight plan route. Thus, in an illustrative embodiment, the direct-to route often becomes the reference flight plan route. The dynamic weather route system 102 automatically finds direct-to routes to eligible downstream fixes that can save one or more minutes of flying time, wind-corrected.

For the dynamic weather route system 102, a flight with a large dog-leg is one where the flying time savings to a downstream fix is greater than a predetermined critical trigger value, 5 minutes for example. In an embodiment, the critical trigger value is adjustable by the user based on workload, airspace, and other factors. For example, a user may specify a time savings less than 5 minutes or more than 5 minutes depending on user workload. In an embodiment, eligible downstream return capture fixes are limited so as not to propose a new route that takes an aircraft substantially off its current route of flight, or substantially off the portion of its route of flight that is not impacted by weather.

Figure 5:
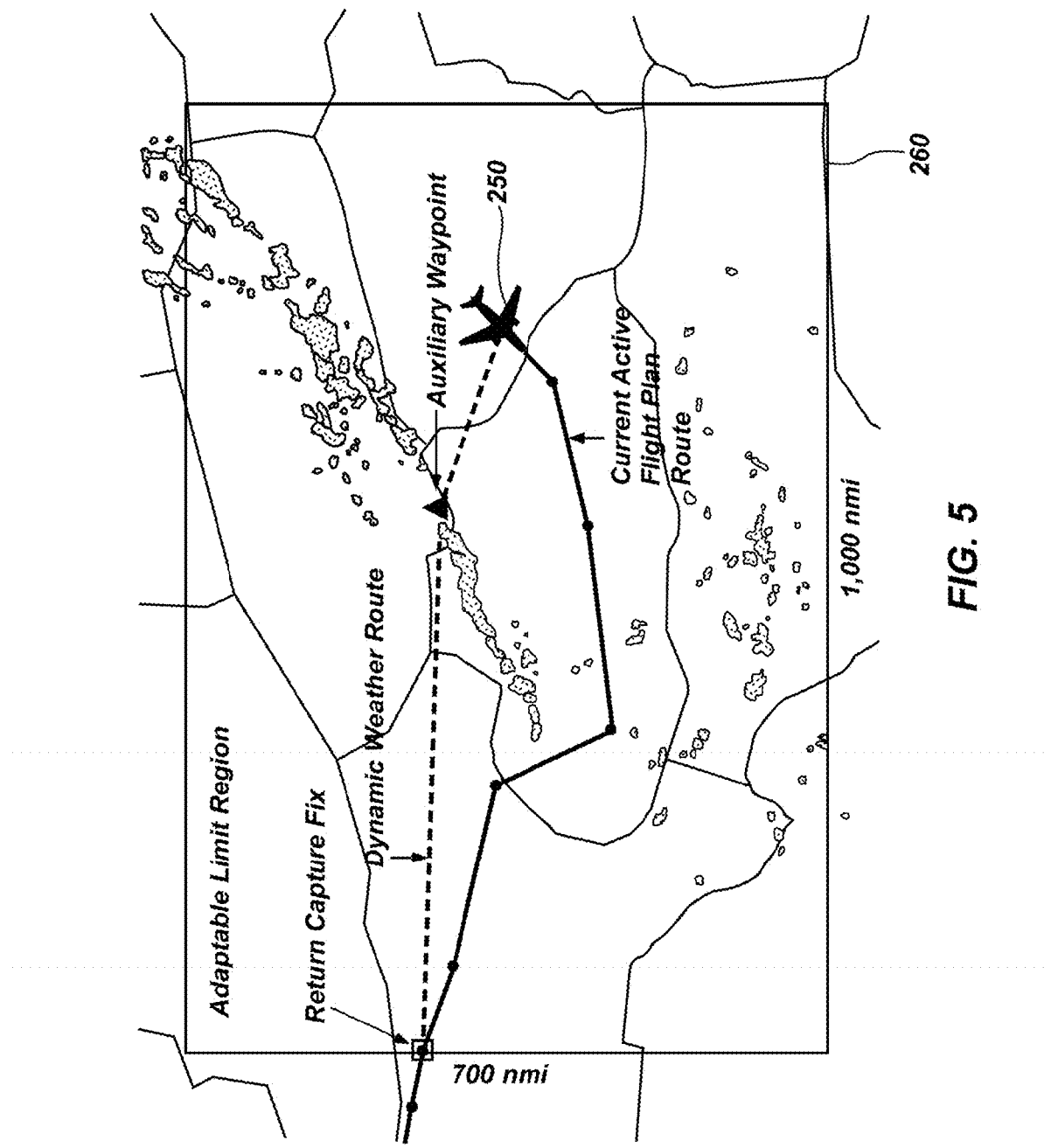
FIG. 5 depicts a diagram of an exemplary limit rectangle for a return capture fix according to an illustrative embodiment of the present disclosure.

In an illustrative embodiment, and as shown in FIG. 5, the return capture fix is the furthest downstream flight plan fix that satisfies one, two, or all of the following criteria: (i) the return capture fix is inside a limit rectangle 260, (ii) the return capture fix is the last fix before the Standard Arrival Route, and (iii) the return capture fix is 100 nautical miles or more from the destination airport.

In an illustrative embodiment, the limit rectangle 260 is user adaptable and may be adjusted as appropriate for the particular airspace. For example, the limit rectangle 260 for a U.S. East Coast Center will likely be smaller or have one or all of its boundaries (North, South, East, and West) closer to the home Center boundary. Alternatively, the return capture fix may be selected as a function of routing between city pairs. In an illustrative embodiment, capture fix selection limits are determined by local Center experts. As shown in FIG. 5, a 700×1,000 nautical mile limit rectangle 260 may be used. Again, the size of this limit rectangle 260 may be user adjustable.

Referring back to FIG. 3, at step 206, if a reference flight plan route meets the limit rectangle and time savings criteria described in the previous step, the dynamic flight plan route system 102 tests the reference flight plan route for conflict with modeled weather and traffic. If no weather or traffic conflicts exist, the process skips to step 214. Otherwise, the process proceeds to step 208.

At step 208, if weather or traffic conflicts are detected on the reference flight plan route in the previous step, the dynamic weather route system 102 attempts to find a minimum delay reroute, referred to herein as the "dynamic flight plan route," relative to the reference flight plan route. Exemplary dynamic flight plan routes are shown in FIGS. 4 and 5 and are labeled as "dynamic weather route" in each of FIGS. 4 and 5.

In an illustrative embodiment, the dynamic weather route system 102 resolves weather conflicts on a 60 minute time horizon. In an illustrative embodiment, traffic conflicts are resolved on a 12 minute time horizon. Since weather avoidance accounts for most of the delay in air traffic operations, two solutions are computed by the dynamic weather route system 102, and users can configure the system 102 to post weather solutions only or integrated weather and traffic solutions.

To find the dynamic flight plan route, the dynamic weather route system 102 generates candidate solution routes by inserting up to two auxiliary waypoints between a flight's current track position and the capture fix of the reference flight plan route. Exemplary auxiliary waypoints are depicted in FIGS. 4 and 5.

In an illustrative embodiment, auxiliary waypoints are first computed in the x-y coordinate frame for the home Center, then converted to fix-radial-distance (FRD) format relative to nearby named fixes. (Named fixes are based on the FAA 56-day adaptation, supplemented with fixes from the national En-Route Automation Modernization (ERAM) adaptation data base and the Navigation Reference System (NRS).) Nearby named fixes are selected according to the following search ordering:

Capture fix if distance<100 nmi, or
Nearest flight plan fix if distance<100 nmi, or
Nearest non-NRS nearby fix if distance<100 nmi, or else
Closest flight plan fix (even if distance>100 nmi).

The dynamic weather route system 102 then tests the candidate solutions for flying time delay relative to the reference flight plan route. The candidate solution that results in the minimum flying time delay relative to the reference flight plan route and meets the weather, or weather and traffic constraints is selected as the candidate "dynamic flight plan route" for further analysis by the dynamic weather route system 102.

Referring again to FIG. 3, at step 210, the dynamic weather route system 102 optionally snaps the auxiliary waypoints in the dynamic flight plan route determined in step 208 to nearby named fixes. That is, since solutions that include auxiliary waypoints defined in terms of FRDs are suitable only for data link applications, neighboring solutions where FRD waypoints are replaced with nearby named fixes are automatically computed.

Using the FRD auxiliary waypoint solution as a starting point, the dynamic weather route system 102 attempts to find that combination of nearby named fixes that when used in place of their respective FRD waypoints still do not cause the flight trajectory to conflict with modeled weather, or weather and traffic.

In this analysis "nearby" is defined to be within a preset distance, such as 25 nautical miles of the FRD auxiliary waypoint. The named fix trajectory that is minimum delay relative to the FRD trajectory, and does not conflict with weather, or weather and traffic, is selected as the nearby named fix solution and the dynamic flight plan route is modified accordingly. FIG. 4 depicts a nearby named fix with reference to a FRD auxiliary waypoint.

Referring to FIG. 3, at step 212, the dynamic weather route system 102 tests the dynamic flight plan route that results in the minimum flying time delay relative to the reference flight plan route found in steps 208 and 210 for potential flying time savings relative to the actual current flight plan trajectory. If the time to fly along the dynamic flight plan route saves more time than a preset amount, e.g., 5 minutes, the process continues to step 214. If the time saved by the proposed dynamic flight plan route is less than the preset amount, then the process returns to step 204. The preset amount of flying time savings may be user adjustable dependent upon workload. The preset amount of flying time savings may also be set to some value less than the trigger value for the reference flight plan, e.g., less than 5 minutes. The reason for this is that it may be more important to display a flight with a potential reference route savings of 5 or more minutes even though the savings for the dynamic weather route solution is less than 5 min. The user might be able modify the dynamic weather route solution to achieve greater savings. At step 214, for all flights that meet the minimum flying time savings criteria in step 212, their proposed dynamic flight plan routes and their actual current flight plan trajectories are analyzed for downstream sector congestion by the dynamic weather route system 102. If a proposed dynamic flight plan route would take an aircraft directly into a congested sector, the reroute would likely be unacceptable from an air traffic control perspective.

Alternatively, if the current active flight plan has the aircraft flying into congested airspace, while the dynamic flight plan route takes the flight out of congested airspace, then the proposed dynamic flight plan route might be preferable and ease congestion. The user (either a flight dispatcher or a traffic manager) at this point can look at the congestion information and decide based on their requirement whether the proposed dynamic weather route is acceptable from a congestion point of view.

In an illustrative embodiment, the dynamic weather route system 102 may utilize the FACET technology for computing downstream sector congestion. As mentioned above, FACET is a National Airspace System (NAS)-based data analysis and simulation system, which reads in FAA provided air traffic data. The aircraft paths are simulated, with NOAA Rapid Refresh one, two, three, and six-hour winds, to fly along their nominal flight plans as filed with the FAA, using the Base of Aircraft Data (BADA) look up tables for aircraft performance, or other aircraft performance data. The aircraft location at each one-minute step for a two-hour period is added to corresponding sector counts. The monitor/alert parameter (MAP) values are obtained from the FAA as well. Each aircraft's current flight plan route and the proposed dynamic flight plan route determined by the dynamic weather route system 102 are checked for travel through congested sectors.

At step 216, the dynamic weather route system 102 posts the proposed dynamic flight plan routes to a computer-generated list 270 on the display 112 as shown in FIG. 7. In an illustrative embodiment, the list generated by the system 102 displays, aircraft call sign and aircraft type, the departure and destination airports, potential flying time savings for the reference flight plan route, potential flying time savings for the dynamic weather route, the return capture fix and the number of auxiliary waypoints in the dynamic flight plan routes, traffic conflict status, sector congestion status, weather conflict status, and the status of any active Traffic Management Initiatives (TMIs) for the flight (TMU status not shown in FIG. 6).

In an illustrative embodiment, the dynamic weather route system 102 may allow a user to set alert values based upon user workload, potential flying time savings benefit, and other factors. In an illustrative embodiment, the list is configurable to display FRD solutions or snap-to-named-fix solutions.

Referring to FIG. 3, at step 218, the dynamic weather route system 102 includes a trial planner that is the user's primary tool for evaluating dynamic flight plan routes. In particular, an interactive rapid-feedback trial planner tool, which is part of the dynamic weather route system 102, enables users to quickly and easily visualize the proposed dynamic flight plan routes and modify them if necessary.

Figure 8:
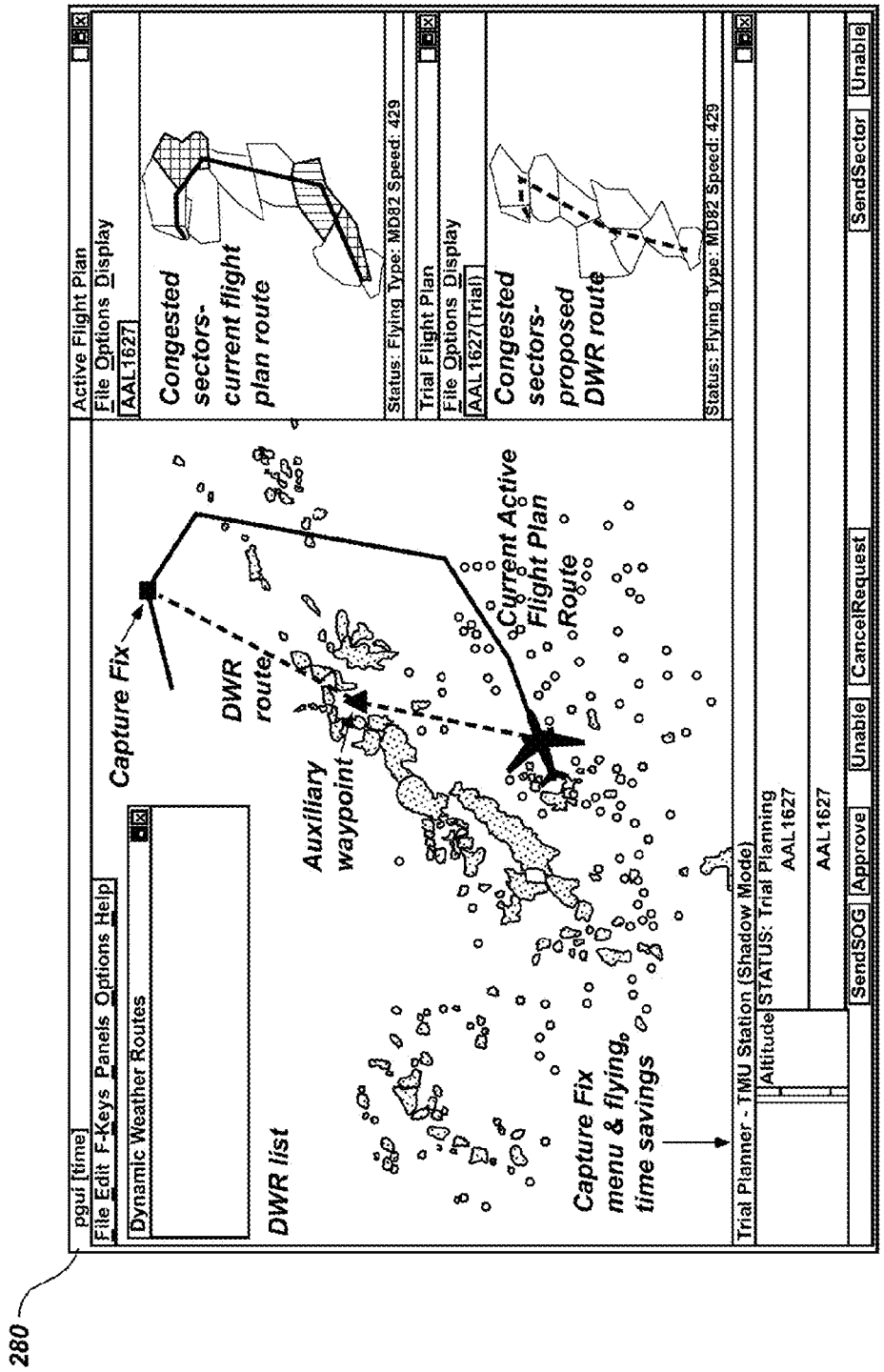
FIG. 8 is an exemplary screen shot of a graphical user interface generated according to an illustrative embodiment of the present disclosure.

FIG. 8 depicts an exemplary screen shot 280 of a graphical user interface. A user may click on the list to activate a trial plan for a selected flight. Through the graphical user interface, a user is able to change the capture fix. Auxiliary waypoints may be moved through a click and drag procedure to adjust the dynamic flight plan route or to automatically snap to a nearby named fix. Auxiliary waypoint may also be added or removed the point and click actions. Traffic and weather conflict status, flying time savings, and downstream sector congestion information are updated and displayed in real-time as a user adjusts the trial plan route.

NAS Constraint Evaluation and Notification Tool

Another embodiment and method for dynamically routing aircraft is presented below pursuant to the present invention. The dynamic weather route system 102 disclosed and discussed above can be utilized for use with one Air Route Traffic Control Center, or Center, at a time. However, to more fully take advantage of and utilize the benefits of a dynamic constraint avoidance route system, a multi-Center system, NAS Constraint Evaluation and Notification Tool (NASCENT), has been developed to run the CTAS systems for as many Centers as a user desires. For example, there are currently 20 Centers across the Contiguous United States of America that can provide and utilize key information regarding dynamic constraint avoidance routes, using NASCENT. NASCENT is an automation within FACET. NASCENT employs the NAS-wide simulation and analysis capability of FACET, along with constraint algorithms therein.

NASCENT is designed to automatically and continuously compute more efficient flying routes around constraints. Constraints may include, for example, weather, such as convective weather; special use airspace (SUA), such as a Military Operations Area; airspace designated as Temporary Flight Restriction (TFR); and other constraints limiting the use of specified airspace.

For individual flights NASCENT uses the aircraft performance tables specified by the Base of Aircraft Data, or other aircraft performance data, for computing climb, cruise, and decent trajectories. Similar to the dynamic weather routes system previously described, reference routes are created using NASCENT that save more than a user-specified quantity of flying-time savings, for example, five minutes of flight time savings. The return capture fix for the reference route is the last fix on a current flight plan within a limit region. These routes are checked against the formulated constraint polygons and auxiliary waypoints are added as necessary to avoid constraints. The wind-corrected flying time savings can then be recorded for each flight.

Figure 9:
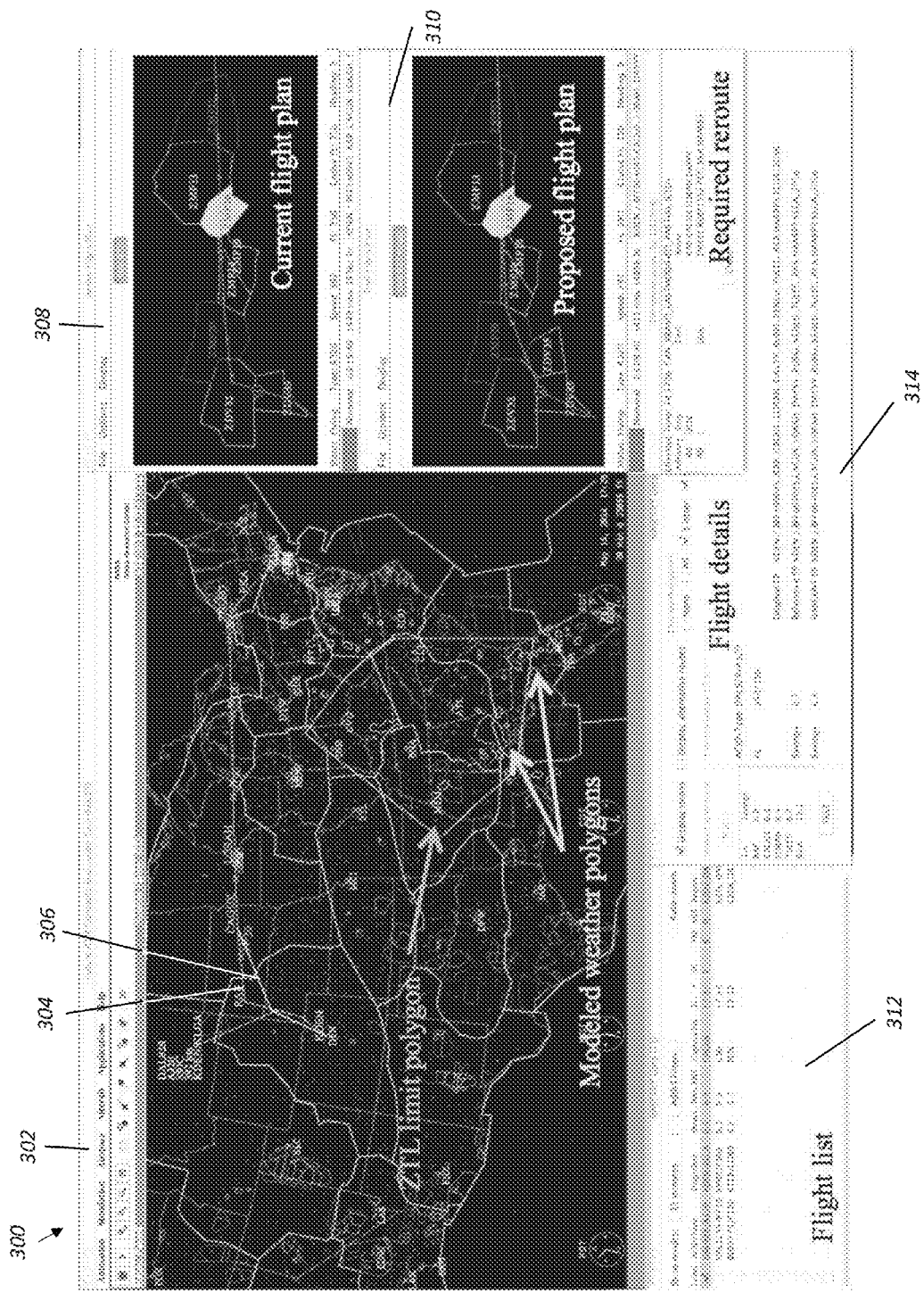
FIG. 9 is another exemplary screen shot of a graphical user interface generated according to an illustrative embodiment of the present disclosure.

As shown in FIG. 9, NASCENT includes a user interface and display 300. Window 302 shows a user the Centers and state boundaries, or limit polygons, as well as formulated constraint polygons. Window 302 also displays the current flight plan 304 and, simultaneously, displays a proposed time-saving route 306. The display 300 also includes two windows 308 and 310 that show sector congestion along the current flight plan 308 and the sector congestion for the proposed route 310. Another window 312 displays a list of flights for which constraint avoidance routes are proposed that save more than five minutes of flight time, and therefore, qualify for possible re-routing. Another window 314 displays the current route, a reference route, and the route formulated and proposed by NASCENT.

As previously described, the dynamic weather route system uses single-Center automation, and utilizes a limit rectangle, which is used to find the return capture fix for the reference route. The limit rectangle determines the farthest fix a controller is likely to send a flight. However, NASCENT conducts a savings analysis for multiple Centers. To conduct a savings analysis for multiple Centers, a limit region, or limit polygon, for each desired Center is required. To achieve this, historical flight plan data are analyzed and processed to determine the size and shape of the limit polygon. The size of the limit polygon depends on how far downstream the direct clearances have been granted historically (e.g. last 5 months) by each Center. Each historical flight plan that is analyzed to determine the size of the limit polygon is searched to evaluate if a flight was given a direct clearance to a downstream fix. Then each clearance is recorded for each Center and a list is created of how frequently each direct route cleared fix was used. The top 70% of the most frequently used fixes from that list are used to create a limit polygon. The last fix on the flight plan within the limit polygon is used as the return capture fix for computing the reference route.

Figure 10:
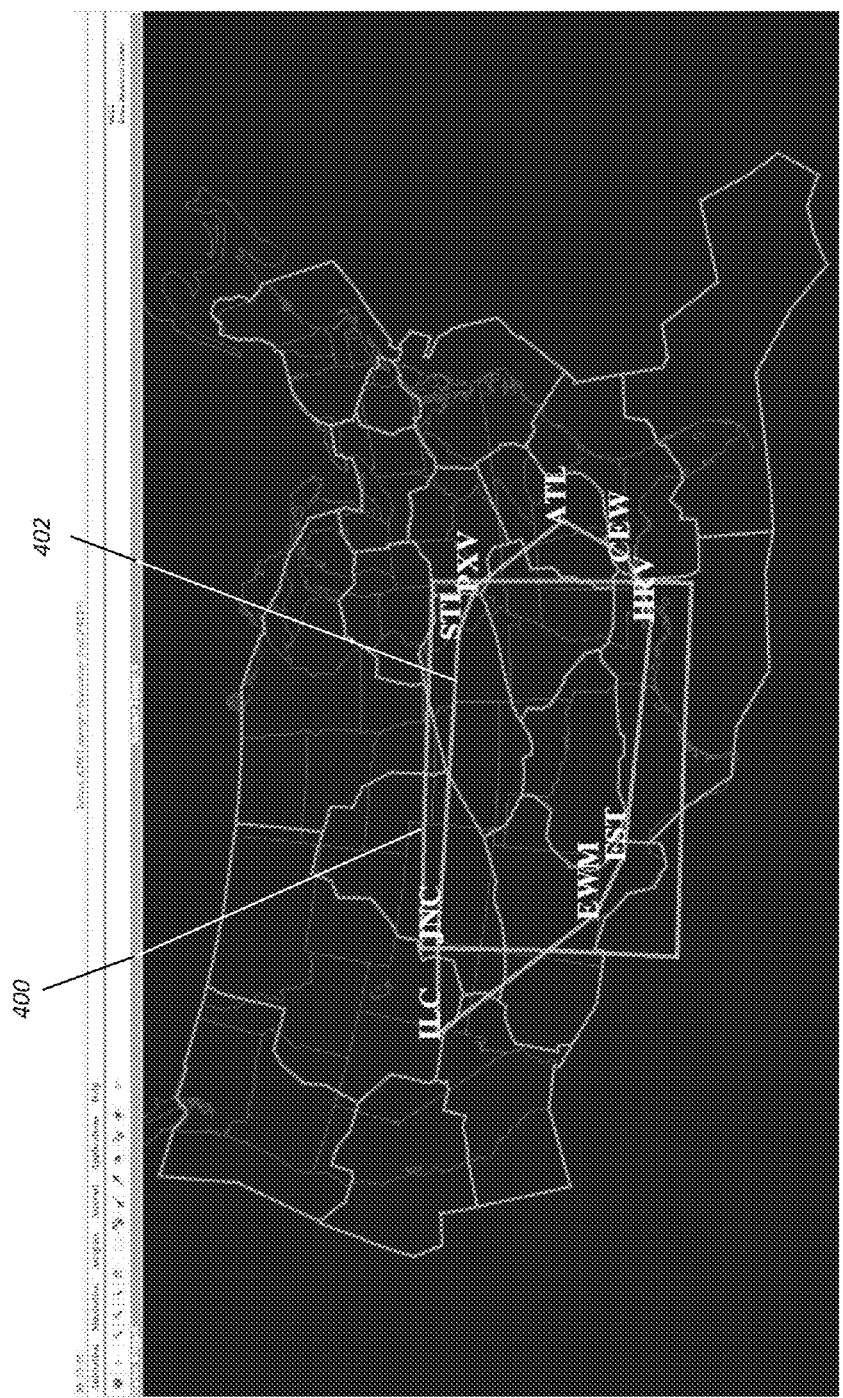
FIG. 10 is a diagram showing a rectangular limit polygon a first embodiment of the present disclosure and a limit polygon of another embodiment of the present disclosure, illustrating relative size and shape.

FIG. 10 further illustrates the differences between the limit polygon 400 formulated by the dynamic weather system 102 and the limit polygon 402 formulated by NASCENT. The limit polygon 402 formulated by NASCENT is created using historical flight data as described above, which provides a more efficient and effective limit polygon, compared with the subjective rectangular shape of the limit polygon used in the dynamic weather route system 102.

Figure 11:
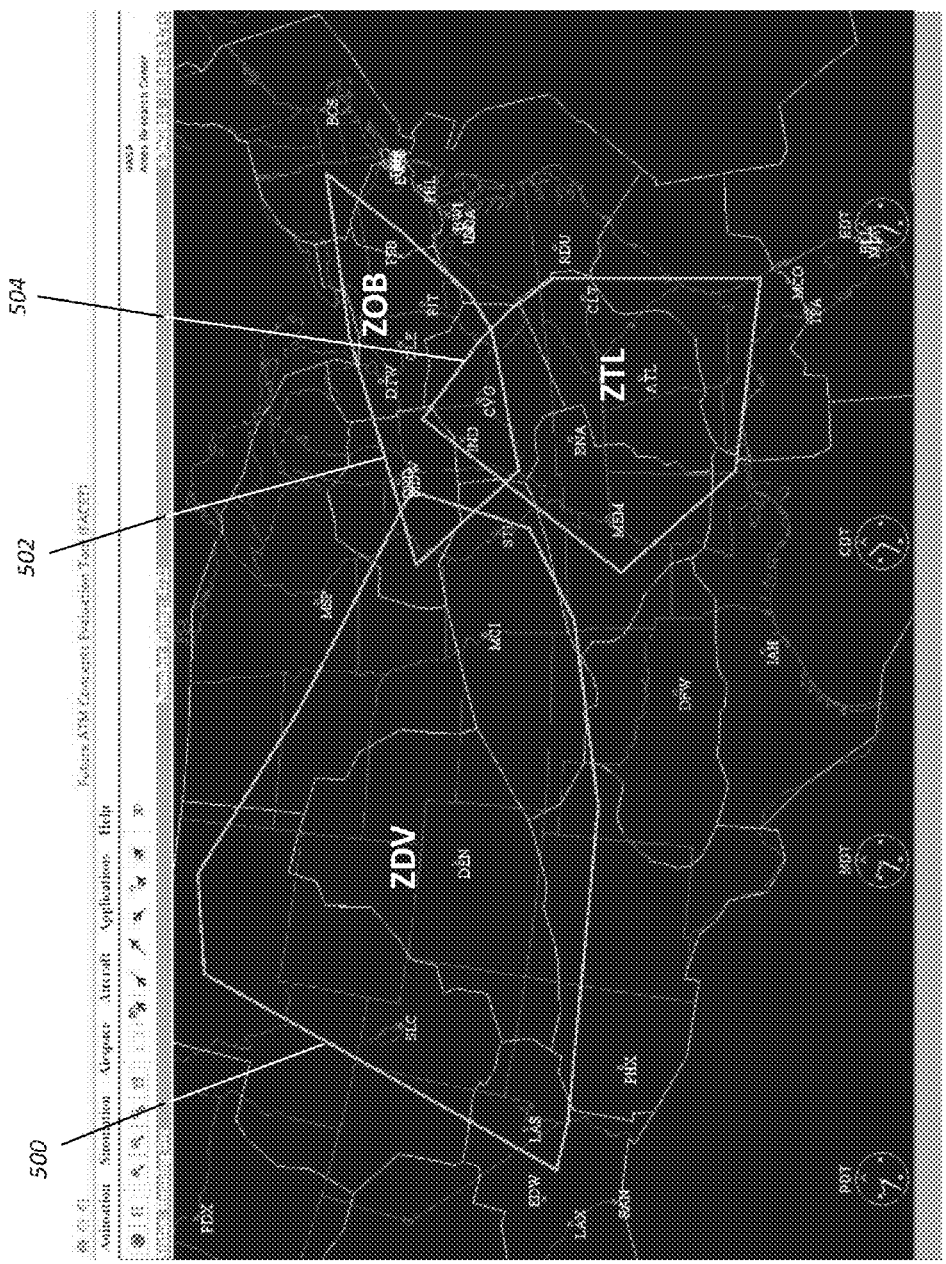
FIG. 11 is a diagram showing multiple limit polygons illustrative of an embodiment of the present disclosure.

FIG. 11 illustrates limit polygons 500, 502 and 504, for Denver (ZDV), Cleveland (ZOB), and Atlanta (ZTL) Centers, which were formulated for use with NASCENT. These limit polygons 500, 502, and 504 are shown in FIG. 11 to show the comparative sizes and shape of different limit polygons. Due, at least in part, to having greater congested flight traffic, certain limit polygons can be significantly smaller than others. For example, the limit polygon 502 for Cleveland is significantly smaller that the limit polygon 500 for Denver because of the increased flight congestion about the Cleveland Center.

In the previously-described dynamic weather route system 102, the weather avoidance algorithm of the Automated Airspace Concept is used to avoid weather polygons. However, in NASCENT, the formulated constraint polygon, for example a weather polygon, can be formed using a Convective Weather Avoidance Model (CWAM) 70% pilot deviation probability weather polygon. A convex hull is created around this polygon first and is then inflated according to a user specified buffer (e.g. 20 nmi) at each vertex. These inflated convex hull polygons are avoided by NASCENT using a normalized convex hull avoidance algorithm. NASCENT can also gather and analyze weather data and other constraint data from different agencies.

In the dynamic weather route system 102, the additional buffer is not applied because the CWAM model provides a probability of pilot deviation for storm intensity and height. In NASCENT, the buffer is used to be conservative and to implicitly include FAA required 20 nmi distance from weather, for example. A similar buffer can be applied to other constraint polygons such as SUA polygons and TFR polygons. If any two constraint polygons in a desired flight path, at the same altitude and a similar time, intersect, the two constraint polygons are merged into a single polygon, creating a single formulated constraint polygon, which is used in the constraint avoidance algorithm implemented by NACSENT.

If a flight is climbing, the NASCENT avoidance algorithm uses recorded altitude weather contours for avoidance, for example. NASCENT can also implement a normalized formulated constraint polygon algorithm which includes automatic excess waypoint removal, can make analysis more efficient by limiting the number of waypoints to be a desired predetermined number of waypoints.

Once the multiple-Center limit polygons and formulated constraint polygons are created, as discussed above, NASCENT formulates new proposed time saving flight routes using the same data analysis steps and calculations described with the dynamic flight route system previously described, and specifically described in illustrated in FIGS. 3-5, discussed herein. However, NASCENT can also utilize a Maneuver Start Point (MSP) slider, which can be used to dynamically update proposed flight routes for aircraft by accounting for the time necessary for coordination and approval of new proposed flight routes.

NASCENT can also be used to display and monitor high value flights to ensure that priority is given to any potential time savings and is available and considered for high value flights. A NASCENT user can also customize the display to filter proposed flight routes to include desired characteristics (e.g., particular destinations).

NASCENT can be used to avoid additional airspace constraints, utilizing corresponding avoidance polygons, such as Temporary Flight Restriction (TFRs), Special Use Airspace (SUA) and other desired avoidance polygons.

NASCENT can be customized to implement a nuisance filter for flights that have specific desired flight plans. NASCENT can also be configured to remove stale results from the proposed flight list, which can enable a user to focus attention on more meaningful and useful results. NASCENT can also generate a notification when congested sectors, Special Activity Area encounters, and FAA imposed reroute traffic Management initiatives are located along the current associated flight plans or proposed constraint avoidance routes.

In the foregoing Detailed Description, various features of the present disclosure are grouped together in a single or limited illustrative embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed illustrative embodiment. Thus, the following claims are hereby incorporated into this Detailed Description of the Disclosure by this reference, with each claim standing on its own as a separate illustrative embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A computer implemented method for a continuous and automatic real-time search that generates and proposes time-saving flight route corrections for a plurality of in-flight en-route aircraft that could avoid constraints while saving flight time, by use of an air traffic routing computer system installed at air operations or control Centers, the method comprising:
   providing an air traffic routing computer system;
   searching for and identifying a plurality of in-flight en-route aircraft and their associated flight plans in multiple Centers;
   receiving real-time updates of aircraft state data and airspace constraint data relevant to the plurality of in-flight en-route aircraft, wherein the airspace constraint data includes real-time constraint data and the real-time constraint data includes convective weather data originating from NexRad radars;
   generating limit polygons corresponding to each of the Centers, where each of the limit polygons are defined by waypoints corresponding to the multiple Centers to direct flights;
   processing 4-dimensional (4D) trajectory predictions for the plurality of in-flight en-route aircraft based on the real-time updates of aircraft state data and airspace constraint data;
   generating a plurality of reference flight routes for the plurality of in-flight en-route aircraft based on the aircraft state data, the airspace constraint data, and associated trajectory predictions, each of the reference flight routes having a starting point at or near the aircrafts' current position within the corresponding limit polygon, and an ending point within or on the same limit polygon, and wherein the reference route saves a number of minutes of flying time on the associated flight plan;
   testing the reference flight routes to identify preferred reference routes that save a predetermined number of minutes of flying time on the associated flight plan;
   searching for constraints along the preferred reference routes;

defining route corrections to the associated original flight plans for the plurality of the in-flight en-route aircraft by either:
(i) selecting the preferred reference routes as the route corrections to the associated original flight plans when the preferred reference routes are free of constraints; or
(ii) (a) automatically resolving constraints in en-route airspace along the preferred reference routes when the preferred reference routes are not free of constraints to thereby create current corrected routes, the constraints automatically resolved on the air traffic routing computer system;
(b) testing, with the air traffic routing computer system, the current corrected routes to identify preferred corrected routes that produce a minimum flying time savings relative to the associated preferred reference routes; and
(c) selecting, with the air traffic routing computer system, the preferred corrected routes that have the greatest flying time savings relative to the associated original flight plans, the selected preferred corrected routes becoming the route corrections to the associated original flight plans; and
proposing the route corrections to the associated original flight plans as dynamic constraint avoidance routes; and
repeating the above, continuously and automatically, for the plurality of in-flight en-route aircraft as real-time updates of aircraft state data and airspace constraint data relevant to the plurality of in-flight en-route aircraft are received.

2. The method of claim 1, further comprising:
updating the associated flight plans of the plurality of in-flight en-route aircraft with the dynamic constraint avoidance routes.

3. The method of claim 1, further comprising:
using a computer graphic user interface to display the dynamic constraint avoidance routes when one or more of the aircraft's associated flight routes have been processed and a route correction has been generated.

4. The method of claim 1, wherein testing the reference routes to identify preferred reference routes includes testing the reference routes to identify preferred reference routes that produce a minimum potential wind-corrected flying time savings relative to the associated original flight plans.

5. The method of claim 1, wherein resolving constraints in en-route airspace along the preferred reference routes includes creating constraint polygons using user entered data and generating current corrected routes avoiding one or more of the constraint polygons.

6. The method of claim 5, wherein two or more constraint polygons are merged if they overlap at a similar altitude and a similar time.

7. The method of claim 1, further comprising:
generating a notification when congested sectors, Special Activity Area encounters, and FAA imposed reroute traffic Management initiatives are located along the current associated flight plans or proposed dynamic constraint avoidance routes.

8. The method of claim 4, wherein the predetermined number of minutes of wind-corrected flying time on the associated flight plan is greater than 5 minutes.

9. The method of claim 1, wherein the size and shape of each of the limit polygons are defined by waypoints that have been historically used by the corresponding Centers to direct flights.

10. The method of claim 9, wherein the waypoints defining the limit polygons have been used by the Center to direct flights within the last 5 months.

11. The method of claim 1, wherein the constraints include at least one of weather constraints and special use airspace constraints.

12. The method of claim 1, wherein resolving constraints in en-route airspace along the preferred reference routes includes creating one or more auxiliary waypoints to form the preferred reference routes to avoid constraints.

13. The method of claim 12, wherein at least one auxiliary waypoint has a nearby named navigational fix.

14. The method of claim 13, further comprising:
replacing at least one auxiliary waypoint with the nearby named navigational fix.

15. The method of claim 12, wherein the number of created waypoints is minimized to reduce aircraft navigation.

16. The method of claim 15, wherein the number of waypoints is two in order to minimize navigation of commercial air transport operations.

17. The method of claim 3, further comprising:
generating an interactive flight map and interactive functions on the computer graphic user interface that enable users to visualize the route corrections to the associated original flight plans, modify the location and/or the number of auxiliary waypoints or change the capture fix, and then automatically see the impact of their modifications and changes on critical parameters such as proximity to weather, traffic conflicts, flying time savings, and downstream sector congestion.

* * * * *